United States Patent
Cole et al.

(10) Patent No.: US 9,239,961 B1
(45) Date of Patent: Jan. 19, 2016

(54) TEXT RECOGNITION NEAR AN EDGE

(71) Applicant: Amazon Technologies, Inc., Reno, NV (US)

(72) Inventors: Matthew Joseph Cole, Arlington, MA (US); Yue Liu, Brighton, MA (US); David Paul Ramos, Cambridge, MA (US); Avnish Sikka, Acton, MA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 14/495,589

(22) Filed: Sep. 24, 2014

(51) Int. Cl.
*G06K 9/00* (2006.01)
*G06K 9/18* (2006.01)
*G06K 9/32* (2006.01)

(52) U.S. Cl.
CPC .............. *G06K 9/18* (2013.01); *G06K 9/00456* (2013.01); *G06K 9/325* (2013.01)

(58) Field of Classification Search
None
See application file for complete search history.

(56) References Cited

U.S. PATENT DOCUMENTS

| | | | | |
|---|---|---|---|---|
| 6,252,984 B1* | 6/2001 | Haneda | ................... | G06K 9/033 382/181 |
| 6,507,812 B1* | 1/2003 | Meade | ................... | G06F 9/4448 704/8 |
| 7,426,054 B1* | 9/2008 | Saito | ................... | G06K 9/00442 358/1.16 |
| 8,364,709 B1* | 1/2013 | Das | ................... | G06F 17/30542 707/780 |
| 2003/0044068 A1* | 3/2003 | Kagehiro | ................ | G06K 9/325 382/182 |
| 2005/0238257 A1* | 10/2005 | Kaneda | ............... | G06K 9/00463 382/305 |
| 2005/0259866 A1* | 11/2005 | Jacobs | ................ | G06K 9/00463 382/157 |
| 2006/0006235 A1* | 1/2006 | Kurzweill | .......... | G06K 9/00993 235/454 |
| 2006/0013444 A1* | 1/2006 | Kurzweil | ............ | G06F 17/2211 382/114 |
| 2006/0015342 A1* | 1/2006 | Kurzweil | ............. | G09B 21/006 704/260 |
| 2006/0017752 A1* | 1/2006 | Kurzweil | ............... | G06K 9/228 345/698 |
| 2006/0017810 A1* | 1/2006 | Kurzweil | ............... | G06K 9/325 348/207.1 |
| 2006/0020486 A1* | 1/2006 | Kurzweil | ............... | G06K 9/228 382/111 |
| 2006/0033967 A1* | 2/2006 | Brunner | ............. | G06K 9/00469 358/474 |
| 2006/0071950 A1* | 4/2006 | Kurzweil | ................ | G06T 5/006 345/698 |
| 2007/0019864 A1* | 1/2007 | Koyama | ............ | G06F 17/30247 382/218 |
| 2008/0031490 A1* | 2/2008 | Kobayashi | ........... | G06K 9/3258 382/101 |
| 2008/0310719 A1* | 12/2008 | Kitora | ................ | G06K 9/00442 382/176 |
| 2009/0103808 A1* | 4/2009 | Dey | ..................... | G06K 9/3283 382/177 |
| 2010/0098336 A1* | 4/2010 | Takahashi | .......... | G06K 9/00993 382/176 |
| 2012/0029920 A1* | 2/2012 | Kurzweil | ............... | G06K 9/033 704/260 |
| 2013/0156322 A1* | 6/2013 | Yaros | ................... | G06K 9/3266 382/195 |
| 2014/0168716 A1* | 6/2014 | King | ...................... | G06K 9/228 358/473 |
| 2015/0134323 A1* | 5/2015 | Cuthbert | ............ | G06K 9/00442 704/3 |
| 2015/0169973 A1* | 6/2015 | Khintsitskiy | ........ | G06K 9/6202 382/182 |
| 2015/0193667 A1* | 7/2015 | Acharya | .................. | G06K 9/18 382/165 |

* cited by examiner

*Primary Examiner* — Aaron W Carter
(74) *Attorney, Agent, or Firm* — Novak Druce Connolly Bove + Quigg LLP

(57) ABSTRACT

The recognition of text in an acquired image is improved by using general and type-specific heuristics that can determine the likelihood that a portion of the text is truncated at an edge of an image, frame, or screen. Truncated text can be filtered such that the user is not provided with an option to perform an undesirable task, such as to dial an incorrect number or connect to an incorrect Web address, based on recognizing an incomplete text string. The general and type-specific heuristics can be combined to improve confidence, and the image data can be pre-processed on the device before processing with an optical character recognition (OCR) engine. Multiple frames can be analyzed to attempt to recognize words or characters that might have been truncated in one or more of the frames.

20 Claims, 9 Drawing Sheets

400

The little children of Germany used to curl up in their mothers' arms, when bedtime came, and listen to the stories of these strange people.

When these little children grew up, they told the same stories to their children.

So it went for many, many year

The stories have been put together by a man named Richa Wagner. He put them together i such a way that they make one

The little children of Germany used to curl up in their mothers' arms, when bedtime came, and listen to the stories of these strange people.

When these little children grew up, they told the same stories to their children.

So it went for many, many year

The stories have been put together by a man named Richar Wagner. He put them together in such a way that they make one

440 he little children of Germany sed to curl up in their mothers' rms, when bedtime came, and sten to the stories of these range people.

hen these little children grew p, they told the same stories to heir children.

o it went for many, many year he stories have been put ogether by a man named Richard agner. He put them together in uch a way that they make one

TEXT RECOGNITION NEAR AN EDGE

BACKGROUND

Recent years have seen drastic increases in the use of portable computing devices, such as smart phones and tablet computers. Today's consumers are utilizing such devices for a wide variety of purposes, such as to research items on the Internet, purchase products and services, capture and/or send digital images, compose electronic mail (email) messages, make telephone calls, and the like. One particular area of attention includes the ability to process image data captured by one or more digital cameras often embedded in such devices, in order to perform various actions based on the information in the image. For example, if the image contains an object that can be recognized as a product, the computing device may invoke an application to purchase the product from an electronic commerce (e-commerce) provider. Similarly, if the image contains an object recognized as a place of business (e.g., restaurant, bar, etc.) or an address, the computing device may invoke a map application to display directions to the user. Many other examples of such image processing are also possible.

In this image processing context, problems may arise when the camera of the computing device is aimed in such a way as to capture only a portion of the object, where the remaining portion of the object is outside of the field of view of the camera. In particular, cutting off portions of certain text in such a manner may cause the computing device to perform actions that are erroneous or do not conform to the expectations of the user.

BRIEF DESCRIPTION OF THE DRAWINGS

Various embodiments in accordance with the present disclosure will be described with reference to the drawings, in which:

FIGS. 4(a), 4(b), and 4(c) illustrate truncated text in each image of a set of three images captured by a camera, which can be analyzed to improve the overall text recognition confidence for edge proximate text in accordance with various embodiments;

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Figure 1A:
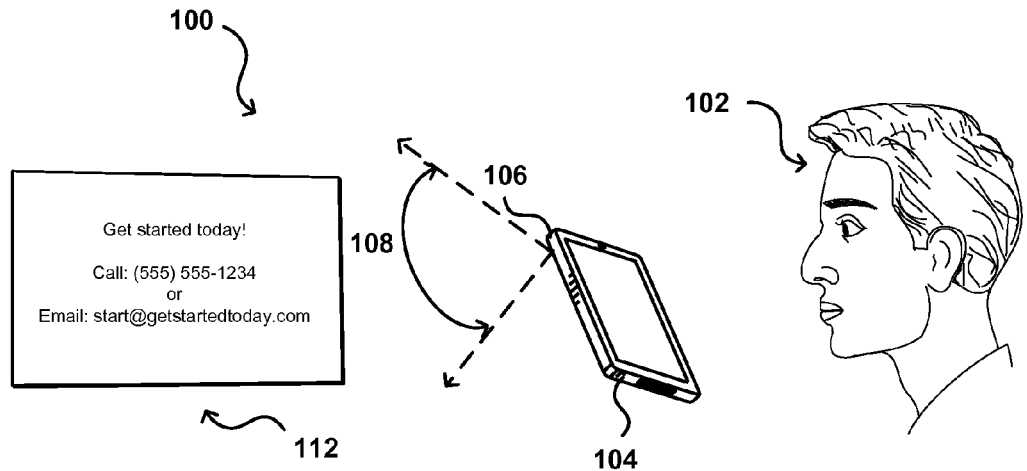
FIGS. 1(a) and 1(b) illustrate an example of a computing device being used to detect text using a captured image, where a portion of the text has been truncated at an edge of the image, which can be utilized in accordance with various embodiments.

Systems and methods in accordance with various embodiments of the present disclosure may overcome one or more of the aforementioned and other deficiencies experienced in conventional approaches for processing image data captured using one or more cameras. In particular, various approaches discussed herein enable a computing device, such as a phone or tablet computer, to detect when text contained in one or more images captured by the camera is truncated at an edge of an image such that the text contained in the image is incomplete. For example, in the situation 100 illustrated in FIG. 1(a), a user 102 is utilizing a computing device 104 to capture an image of text 112 located within a field of view 108 of at least one camera 106 on the computing device 104. The client computing device 102 is shown to be a mobile phone, however the computing device may be any device including a processor and a display, including but not limited to tablet computers, notebook computers, personal digital assistants (PDAs), personal computers (PCs), media players, gaming systems, wearable computers (e.g., smart watches or classes), and the like. The computing device 104 may include one or more digital cameras configured to capture an image or a sequence of images. In at least some embodiments, the computing device 104 may operate in a live camera view mode, where a sequence of images being captured by the camera 106 is continuously being displayed on a display screen of the computing device 104.

Additionally, while capturing image data the computing device 104 may display various information and graphical elements overlaid on top of the objects (e.g., blocks or strings of text) in the image currently being displayed, such as to indicate to the user that a particular portion of the image may be actionable (i.e., be associated with a function or application that may be invoked on the device), recognized, and/or truncated. For example, the computing device 104 may display graphical elements (e.g., boxes, oval shapes, etc.) around recognized and/or actionable text detected in an image stream, in order to indicate that the object in the image corresponds to a recognized object such as a phone number or uniform resource locator (URL) of a web page. The user is enabled to select at least some of the graphical elements, such as by touching a region of the touch screen display associated with the graphical elements.

Figure 1B:
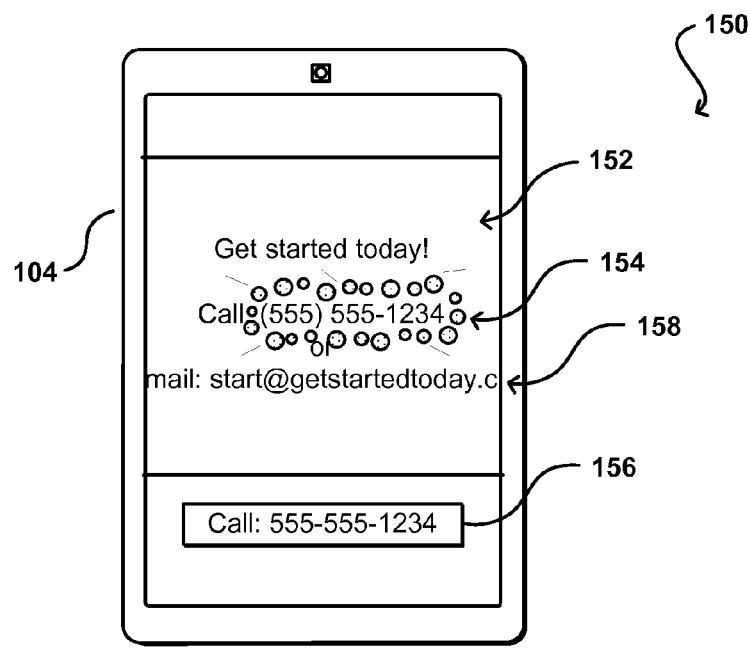

As an example, in the situation 150 of FIG. 1(b) the device has analyzed an image 152 captured by the device 104 and displayed on the display of the device. It should be understood that reference numbers may be carried over between figures for similar elements for simplicity of explanation, but such usage should not be interpreted as a limitation on the various embodiments. The device, or software in communication with the device, can have recognized that a first string of text 154 corresponds to a phone number, which in this example corresponds to "actionable text," as discussed later herein. Accordingly, the device can display a graphical element 156 that enables the user to initiate a call to that number upon user input with respect to that element, such as may occur through touching a relevant area of a touch screen of the device 104. In this example, the device has recognized the phone number using one or more patterns or models for specific types of text. The device may also have recognized a string of text 158 as an email address, but has identified that a right-hand portion of the email address is truncated. This can be due at least in part to the fact that an email address has a certain pattern that ends in one of a limited set of top level domains, and in this example the email address does not have a full domain at the end. Thus, the device can determine that the address is likely truncated and, instead of returning an option to send a message to an incorrect address, can select to filter that text and thus not display an option to send a message to the incomplete, truncated address.

The selection of the graphical element 156 may cause the computing device 104 to invoke an application or a function associated with the object being displayed on the screen. For example, as shown in the illustration, if the user activates graphical element 156, the computing device may invoke a telephony application to cause the device to dial the phone number "(555) 555-1234" as recognized from the image 152 and displayed on the screen of the computing device 104. It is desirable that the computing device not display an option to send a message to the email address, as based on the data from the single image 152 alone the address might appear to be "start@getstartedtoday.c", which is an incomplete email address. While it is possible that the pattern might be recognized and a string identified, it is impossible to know (without further information) whether the email address should be, for example, "start@getstartedtoday.com" or "start@getstartedtoday.co.uk". Due at least in part to this uncertainty, an option to automatically email the target email address may not be provided as a result of the text string truncation.

Although the illustration in FIG. 1(*b*) shows an example of detecting an incomplete email address, it is noted that many other examples of incomplete actionable text may be inferred within the scope of the various embodiments described herein. For example, actionable text may include, but is not limited to, web site URLs, telephone numbers, addresses, ZIP codes, barcodes and UPC codes, license plate numbers, and the like. In some embodiments, the upper or lower boundary edges may also be utilized to detect incomplete actionable text. For example, certain languages include writing systems where characters are written in a vertical sequence as opposed to Latin-based languages where the characters are written in a horizontal sequence. For these languages, the top edge of the image or the bottom edge of the image may be more useful to determine whether the actionable text is incomplete. Similarly, if a barcode is detected in the image and one or more MSERs are detected just underneath the barcode, the computing device may infer that the MSERs correspond to numbers located underneath the barcode. The device may then instruct the user to move the device down (from the user's perspective) if the numbers are needed to perform the action on the device. In addition to actionable text, the various embodiments described herein may also be utilized with non-actionable text, such as in order to determine when the entirety of the textual content has been captured within the camera's field of view.

In particular, if the incomplete text corresponds to actionable text the computing device may wait until the remaining portion of the actionable text is captured by the camera and made available for processing before invoking the corresponding function on the computing device. As used herein, the term "actionable text" can include any textual content recognized in the image that can be used to invoke an application or a function on the computing device. Some examples of actionable text include telephone numbers which may be used to invoke the phone dialer application on the device, web addresses that may be provided to the browser application, email addresses that may be used to invoke the email application to create a new email message and the like. The computing device can attempt to determine whether a text string detectable from an image is sufficiently complete or truncated, as discussed elsewhere herein.

Figure 2A:
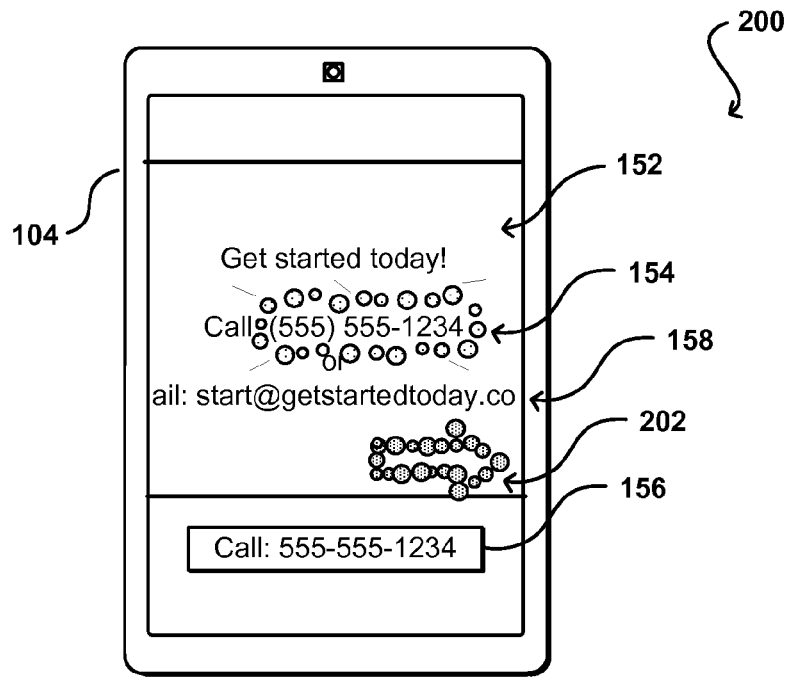
FIGS. 2(a) and 2(b) illustrate an example wherein graphical elements displayed on the computing device prompt a user to move the device in order to cause the truncated text to be brought into view, which enables the actionable text to be recognized in accordance with various embodiments.
Figure 2B:
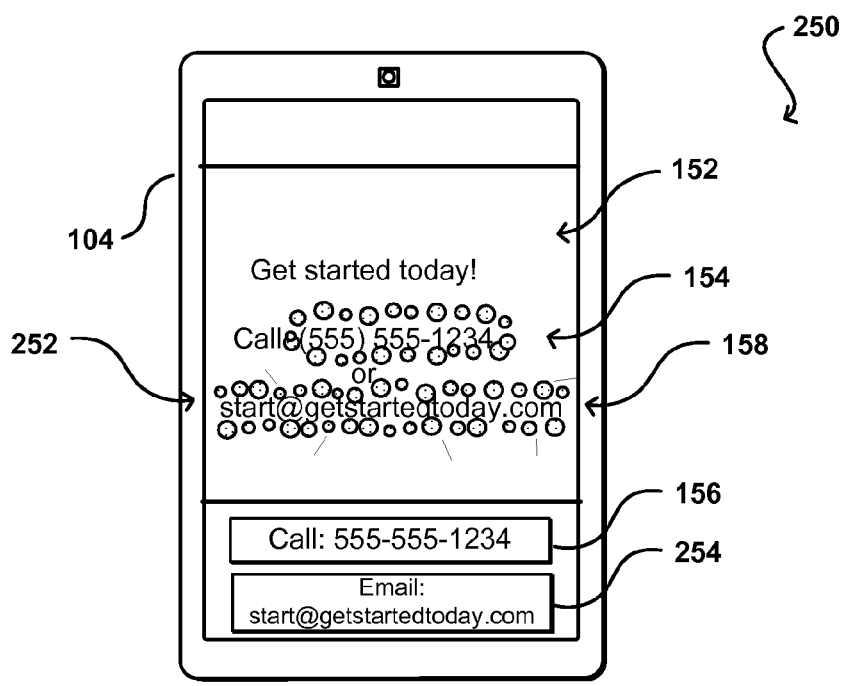

In at least some embodiments, if a device infers that text is likely to be incomplete, the device may display one or more visual hints (e.g., direction arrows, instructions, or other graphical elements) to the user, instructing the user to move the device such that the remaining portion of the actionable text is captured within the field of view of the camera. As an example, the situation 200 illustrated in FIG. 2(*a*) includes a first set of graphical elements 154 indicating a recognized text string, here a phone number, with an associated user-selectable interface element 156 being displayed to enable the number to be dialed with a single selection action, as discussed elsewhere herein. As illustrated, however, the email address is truncated, such that no graphical elements highlight the text string as being recognized and no user-selectable element is displayed to enable an associated action to be performed.

In this example, however, one or more graphical elements 202 can be displayed to prompt a user to move the device such that the remainder of a truncated text string can be brought into the field of view of an appropriate camera. In this situation, since the right end of the text string is truncated an arrow of graphical elements 202 is displayed to prompt the user to move the device slightly to the right to enable the remainder of the email address to be brought into sight. In the example situation 250 of FIG. 2(*b*), the entire email address is visible in the captured image data 152, which causes one or more graphical elements 252 to be displayed to indicate that the text string 158 now recognized. Further, a selectable graphical element 254 is displayed that, upon selection by a user, can cause an email application to be launched, for example, that enables the user to quickly send a message addressed to the recognized address of the text string.

Various other types of text truncation can be detected as well within the scope of the various embodiments. Certain embodiments include heuristics for at least two types of text objects: general text objects and text objects of a specific type. If it is determined that, for example, the user has accidentally truncated a piece of text, such as actionable text, this text can be filtered and no graphical elements relating to that text displayed to the user, at least until a more complete identification can be made. Two classifications of heuristics that are utilized in various embodiments include type-specific and general heuristics, which apply to all actionable text types. An example of a general text heuristic is a heuristic that utilizes the distance from the edge of the frame or image. For example, if text is extracted that has an average character width of 10 pixels, and the extracted text is eight pixels or less from an edge of the frame, it is possible that there are additional characters off of the edge (e.g., right, left, up, or down depending upon the language, for example) of the image that complete the text string. The truncation may be even more likely if glyphs are detected in the same text line and directly preceding the extracted text string. In both cases, it can be desirable to filter the extracted text string and wait for the entire string to be visible, if not centered, in a subsequently captured image frame. Examples of other heuristics for general text can be based upon, for example, optical character recognition (OCR) confidence score, relative positioning to other actionable text (e.g. if there are multiple actionable entities in a frame, and one entity is in the center of the frame while another is closer to the edge, it is more likely that the later entity is not the one being focused on by the user and is possibly truncated), presence of punctuation or non-alphabetic glyphs immediately before or after the text (i.e., another indication of a potentially truncated entity), and the presence of other text that is likely truncated. For example, if it is confident that a piece of text on the right of the frame is truncated, it is also reasonable to infer that other pieces of text on the right of the frame are also truncated. Each of these heuristics could be given a learned weighting as part of a machine-learning model, where the model is trained using images that do, or do not, contain truncated actionable text.

The other classification of heuristic, a type-specific heuristic, can apply to only specific types of text, but can be much more accurate in determining whether text has been truncated. An example of a type-specific heuristic relates to North American phone numbers. A text string might be extracted from an image that includes a seven or ten digit North American phone number. In the case where a ten digit phone number is slightly truncated on the left, it is possible that the number could be incorrectly recognized as a local seven digit phone number, which could result in a bad customer experience if the user is prompted to dial the wrong phone number. Instead, seven digit phone numbers whose left edges are a certain percentage from the left edge of the screen or less (for example, 10% or less) can be filtered in some embodiments. Conversely, it can be determined with relatively high confidence that extracted text strings that begin with the substring "http://" are almost certainly not truncated on the left, because it is impossible to craft a URL that contains "http://" somewhere other than at the beginning of the URL. In this situation, such an extracted address would likely not be filtered, even using the general heuristics described above, such as where the margin between the text and the edge is less than the average character width. Thus, a combination of heuristics can be used advantageously to determine truncated text, as well as to determine whether to filter a string of text, or text object.

Figure 3A:
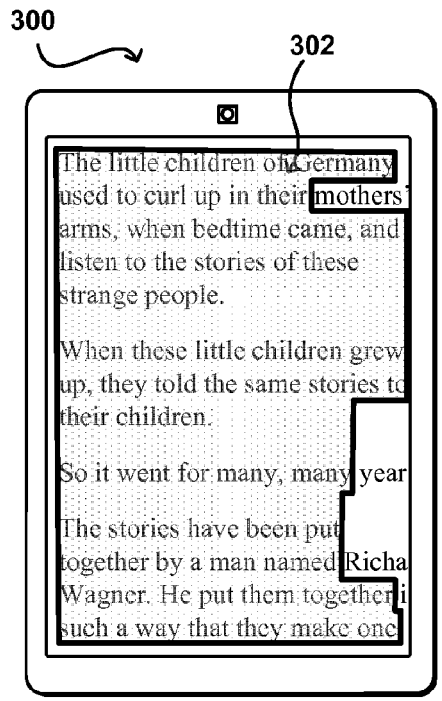
FIGS. 3(a), 3(b), 3(c), and 3(d) illustrate examples of truncated text in captured images that can be managed in accordance with various embodiments.

As an example, the situation 300 of FIG. 3(a) illustrates a series of paragraphs of text that are displayed on a display of a computing device. A shaded region 302 is overlaid on the text in the image for explanation purposes, to show the portion of the text that was identified as complete text that was not truncated. As illustrated, however, there are certain words that fail one or more of the heuristics discussed above. With respect to general text, the string "mothers'" may have been filtered because it was less than an average character width from the screen, as well as the fact that it ends in punctuation and thus may have more afterwards. Similarly, the strings "year" and "Richa" are filtered for being too close to the edge of the image. Other information can be used to determine the confidence that each is truncated. Since "year" is actually a common word, there might be a higher truncation confidence score that the string is not truncated, even with the proximity to the edge. The string "Richa" in this example does not correspond to a word in the dictionary, and thus may have a lower truncation confidence score, or a higher likelihood that the string is truncated. Similarly, the fact that the string "Richa" has been determined to likely be truncated might also lower the truncation confidence of other strings near the right edge, as it has been determined that at least a portion of the text has been truncated at the right edge of the image.

Figure 3B:
Figure 3C:
Figure 3D:

FIGS. 3(b) through 3(d) illustrate situations where type-specific heuristics might be used to better determine that a portion of a string of text has been truncated. In each of these situations, the general heuristic might determine that a portion of the text may be truncated due at least in part to proximity to an edge of the frame. Further, a relevant type-specific heuristic might determine that the text string is truncated based upon a determination of the type of string and the content of that string. For example, in the example situation 320 of FIG. 3(b) a general heuristic algorithm might determine that the string of text 322 towards the bottom of the screen is less than the relevant margin from the right edge of the screen, and thus might be truncated. Further, the heuristic might identify the string as a North American phone number based at least in part upon the pattern of characters of the string. The heuristic might be able to determine with sufficient confidence that the string is a phone number missing the last two digits, and thus can indicate that the text string is truncated and no graphical element or selectable option should be surfaced to the user with respect to this text. Similarly, in FIG. 3(c) the type-specific heuristic might be able to determine that the string is a North American phone number missing at least the first digit, and thus might a truncation confidence score that is less than a minimum truncation confidence threshold, indicating that the string is likely truncated on the left edge of the image.

FIG. 3(d) illustrates an example situation 360 wherein a first email address 362 is recognized by a type-specific heuristic, and is determined with confidence to be truncated on the right edge. The truncation can be determined with confidence as an email address must end in a proper domain, and ".c" at least at present is not a proper domain. The second string 364 that is truncated on the left can be more difficult to qualify. The username portion of an email address can be any random string and does not have to follow a specific format, although naming conventions do apply. Accordingly, it cannot be determined with confidence, absent other information, that the full email address is not visible on the display. A general heuristic might cast some doubt due to the proximity to the edge of the screen, but it can be difficult without more to determine that the email address is left truncated. Various other patterns can be utilized as well, such as may include home addresses, business contact information, international phone numbers, and the like. Types of contact information can include collections of data such as name, title, phone number, email address, URL, and other such information that might be found on a business card, company brochure, and the like.

Accordingly, approaches in accordance with various embodiments attempt to utilize information captured through multiple images, video frames, or other instances of image data to improve the confidence regarding truncation determinations for text objects in an image. For example, FIGS. 4(a) through 4(c) illustrate a set of images of a page of a book that can be captured and analyzed in accordance with various embodiments. A user attempting to identify actionable text, or any of various other types of text objects, will often take several seconds to focus the text in the field of view of the relevant camera of the computing device. During this period, it is likely that multiple frames may be processed by an OCR engine, for example, which can include recognition of text that is off center or out of focus. More specifically, it is possible that there may be a single snippet of actionable text, parts of which are in the camera's view and other parts of which are outside of the camera's view. Extracting only a subset of a subset of a string of text and presenting it as actionable text to the user can provide for a poor customer experience, as discussed elsewhere herein.

In this example, instead of highlighting the text that is recognized and surfaced to the user, boxes are illustrated to identify the text that would be filtered for that image. For example, in the first situation 400 of FIG. 4(*a*) there are three text strings filtered, as indicated by the three boxes 402. The first string, "mothers'", could be filtered by a general heuristic for being less than an acceptable margin from the edge, as well as for ending in punctuation as discussed elsewhere. In some embodiments, any string within a few margin distances from the edge can be filtered or designated as potentially truncated, in order to train the user to center the text of interest in the captured image data. The strings "Richa" and "i" also could be filtered for being too close to the edge, as well as for potentially having a portion of a glyph (e.g., character) truncated on the edge of the screen. In at least some embodiments a preliminary filtering process is executed on the device wherein any glyph that is truncated on an edge of the image is identified and marked for filtering. Because this text is aligned and spaced similarly, and grouped together in a way that indicates togetherness, the truncation confidence score for "mothers'" might be adjusted to indicate that "mothers'" is more likely truncated than previously determined, as there is other text along that same edge that is determined to have been truncated. If no other text had been truncated, then it could have been determined that it was less likely that "mothers'" was truncated in the image. In some embodiments, the truncating of any word in a paragraph on a right or left edge can cause all lines of the paragraph to be assumed to be truncated on that edge, for purposes of providing an actionable text element to the user.

In this example, however, there were three images captured, either as part of an image burst, as extracted frames of video, or at three other times determined automatically or manually by the user, among other such options. As illustrated, there can have been movement of the device and/or book that caused a slightly different portion of the page to be visible in each image. In the example situation 420 of FIG. 4(*b*), the text object "mothers'" is now more than the minimum margin away from the edge, such that it can be determined with relative certainty that the text object is not truncated. While more of "Richar" is visible, it is still determined to likely be truncated in the image and thus shown in a box 422. The word "in" now might be determined to be less likely to be truncated, as indicated by the dotted line of the box 424, although its proximity to the edge make it still somewhat uncertain. By combining the results of the first two images, the word "in" can be determined and surface to the user based on the second image, even though the confidence score for "in" might be less than the confidence score for other recognized words in the first image. In the example situation 440 of FIG. 4(*c*) the string "in" is now far enough away from the edge that it can be determined with relative confidence to be the full text object. The object "Richard" in this case is determined with some certainty, with some uncertainty due at least in part to its proximity to the edge, such that it can be combined with the results from the other images to enable every word to be recognized with at least some certainty based on the combined results for the three images. In the third image there is some truncation on the left edge, as illustrated by the corresponding boxes 442, but because these words have already been determined with certainty from the other images this uncertainty in the third image will not cause these words to be filtered based on this image alone. As long as there is still some truncation, or uncertainty regarding truncation, in all of the images, the system can lower the confidence of any text strings near the edge that might possibly be truncated as well.

Figure 5:
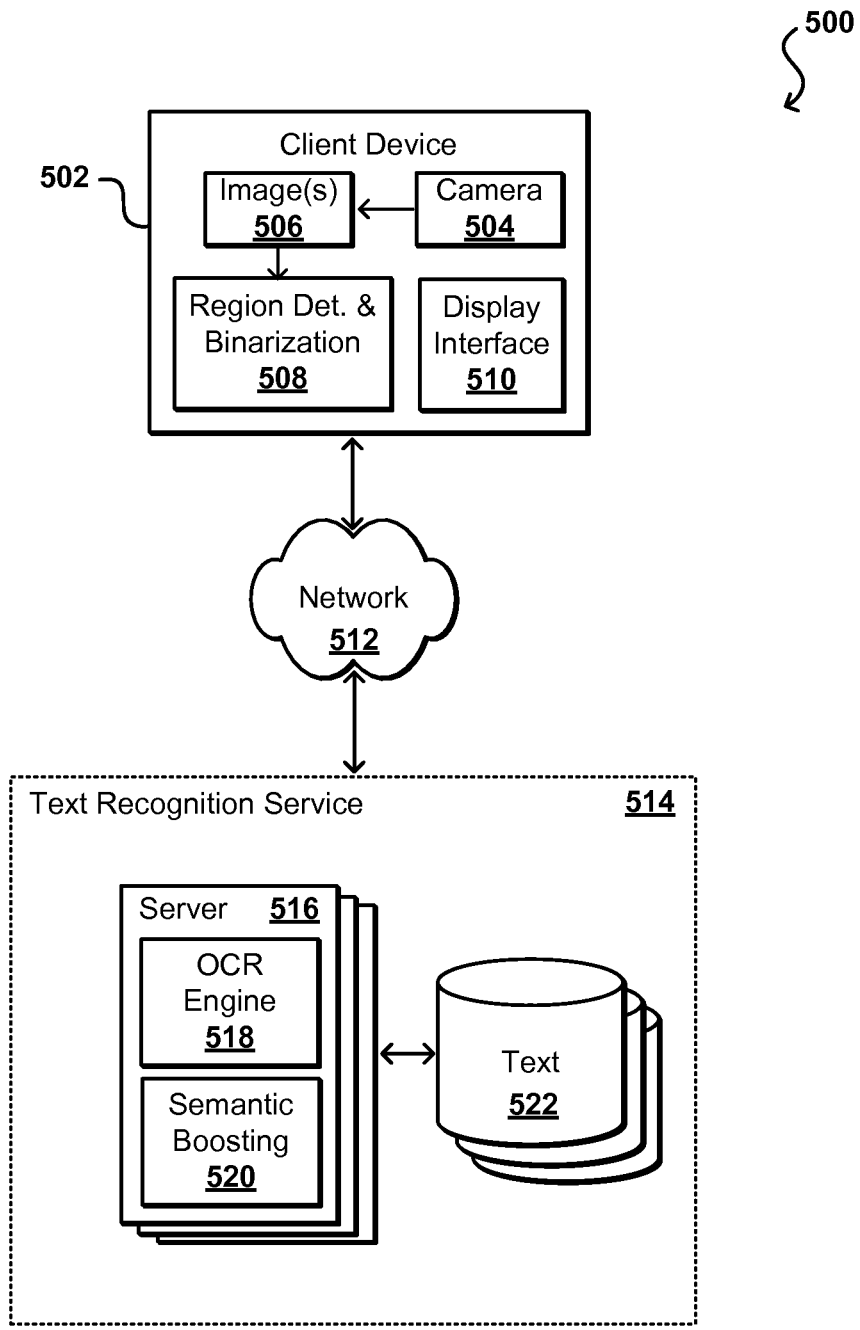
FIG. 5 illustrates an example system that can be utilized to implement aspects of the various embodiments.

Thus, both general and type-specific heuristics can be used advantageously to determine whether or not to filter one or more text entities located in captured image data. In at least some embodiments the decision to filter can be made by a remote system or service, such as a text recognition service 514 as illustrated in the example situation 500 of FIG. 5. In this example, a client device 502 includes at least one camera 504, which can be a single camera, stereo camera, or camera array, among other such options, that is able to capture one or more images 506 including one or more text objects. The images in some embodiments can undergo at least some pre-processing on the device 502, such as may include texture removal and noise reduction, as well as MSET and edge detection processes. For example, the computing device 502 may include a component 508 configured or programmed to process the image to perform one or more tasks. In some embodiments, this can include detecting regions that have characteristics indicative of containing text, as well as to perform binarization of those and/or other regions to be processed by an OCR engine. In some embodiments, the component 508 can be used to detect one or more maximally stable extremal regions (MSER), which can be used to determine whether one or more glyphs are likely contained in any portion of the image. MSER is a region detection algorithm that can be used to look for contrast in different regions of the image and check those regions against a glyph identifier to determine whether the image contains one or more glyphs that may correspond to actionable text. MSER is well known in the art, however, any other algorithms for region and/or glyph detection may be implemented within the scope of the present disclosure. A glyph can be any shape, design, or representation that may correspond to a text character. In some embodiments, at the time of detecting the glyph, the computing device may not be able to determine with sufficient certainty which specific textual character the glyph represents until the image data is processed by the OCR engine, as discussed below. In addition to detecting the areas of the image that are likely to contain glyphs, the computing device may also determine whether the glyphs are arranged in a horizontal line across the display screen. If the glyphs are arranged in a horizontal line, the computing device 302 may infer that the glyphs are more likely to correspond to text and in particular to actionable text.

If one or more glyphs are detected in the image, the client device may further determine whether the glyphs are within a threshold distance from the edge of the image (e.g., and thus the display screen) or are being cut off by the edge of image. For any text or glyphs that are determined to be truncated or too close to the edge of the screen, the device in at least some embodiments can be configured to filter that text and not provide image data for those regions to be processed by the text recognition service 514. In some embodiments, all image data can be provided along with edge distance information, such as information indicating whether the glyphs are within the threshold distance to the edge, or cut off by the edge. As mentioned, selectable elements may not be provided to the user for filtered text, with the interface elements being surfaced to the user through at least one display interface 510 on the client device.

The client device 502 can transmit the image data and any other appropriate data across at least one network 512 to a text recognition service for processing. For the processing of multiple frames, the frames can be sent asynchronously to a stateless service such that the results can be obtained in any order in order to determine appropriate filtering, object surfacing, etc. In such an embodiment it can be the responsibility of the client device to combine the results in a reasonable way. In at least some embodiments, a client device can transfer image data for analysis at the rate of at least several frames per second. The service can include one or more servers 516, data stores 522, and other such components in order to receive and process the image data. In this example, at least one of the servers 516 includes an optical character recognition (OCR) engine 518 configured to recognize at least some of the text contained in the image. Optical character recognition (OCR) systems are well known in the art and are frequently used for recognizing text characters in an image or in other mediums. The text recognized by the OCR engine will typically receive a confidence score. The OCR process in some embodiments can be enhanced using at least one semantic boosting component 520. Semantic boosting can be used to infer the meaning of text and/or the user's intent, which can help to enhance OCR accuracy and increase confidence values for the recognized text. One example of semantic boosting is when the server compares a determined URL in the image to a list of known URLs. If one of the characters in the URL was incorrectly identified by the OCR engine, semantic boosting may provide the correct URL that should have been identified. Another example of semantic boosting may be area code validation, where the server may compare the area code of the user's location with the identified area code and determine whether the area code is valid for the user's location. Another example of semantic boosting is business name validation, where the server compares the text that has been identified as a potential business name to a list of known business names. This allows the server to correct any incorrectly identified characters in the name by the OCR engine. Other examples of semantic boosting are also possible, such as address (e.g., street name) validation, language model validation, and the like. Another advantage of using various OCR engines is that such an engine can also provide values such as font style and width, which can help to improve confidence of truncation based on margin width, where that margin is based at least in part upon the average size of a character in that font. Such an approach can be particularly useful for irregular or unusual fonts, where the average character size might not be known ahead of time.

Results of the processing of the image then can be communicated by the stateless text recognition service 514 back through the at least one network 512 to the client device 502. It should be understood that at least one different network could be used to transmit the results than was used to transmit the request. The client device can determine whether to filter a particular entity, although the subset of text returned by the service as part of a multi-frame merge algorithm could be retained by the device. As discussed with respect to the multi-frame analysis above, character or string based voting can be used to attempt to come to the best determination for each character or text string represented in a series of images. If the service consistently filtered an entity, the client could choose to provide a user interface treatment in the area where the filtering was occurring, such as by highlighting the area being filtered and asking the user to re-center the camera frame on the region, as discussed with respect to the arrow in FIG. 2(a). A user interface treatment might only appear in the event that multiple frames from an asynchronous multi-frame session reported that text was filtered. With additional frames, the confidence can be increased that some actionable text exists on the edge of the frame that the user could be interested in identifying. Even if no user interface treatment is utilized, filtering entities can have the desired side-effect of training the user to center the text that he or she wishes to identify in the camera frame, in order for the process to generate an actionable object.

In various embodiments, the remote service determines or infers whether the recognized text is likely to be incomplete based at least in part on the general and type-specific heuristics. It should be noted that throughout this disclosure the terms "edge of the image" and "edge of the screen" are often used interchangeably and are intended to mean the outermost limit or border of the area captured in the image by the camera of the computing device, or at least that subset of the image that is displayed to the user. The threshold distance to the edge of the image may be selected based on the size of the other characters in the text, the font of the text, the space between each letter in the text, the height of the text, or other such metrics. Along with the resulting text, the service can provide, to the client device, an indication of whether the text is likely to be complete or incomplete. Alternatively, the inference of whether the text is likely to be incomplete may be made on the client computing device, among other such options.

Once the client device receives the text and other relevant data from the server, the client device may control the display of various graphical elements on the display screen according to the recognized corrected text. For example, if the client device determines that the text is completed actionable text, the device may display a graphical element that can be selected by the user to invoke an application associated with the actionable text. Similarly, if the client device determines that the actionable text is incomplete, the device may display instructions to the user to move the device in a particular direction to enable the camera to capture the remaining portions of the actionable text. Alternatively, the device may simply hold off on displaying the graphical element to activate the application until the remaining portion of the text has been determined with at least a minimum threshold level of confidence or certainty.

It should be noted that although some examples described throughout this specification describe some ways to split up the processing between the computing device and a remote server, this is not intended to be limiting to all embodiments described herein. In other embodiments, the processing to determine whether the actionable text is incomplete and other operations may entirely be performed by the client computing device, or entirely be performed by the remote server, or may be split in other ways, as will be evident to one of ordinary skill in the art.

In some embodiments, the heuristics used may be the result of a machine learning model that has been trained using data for different types of text objects. For example, data for different fonts, font sizes, spacing, locations, and other such aspects can be processed using a machine learning model in order to develop a heuristic that is robust to font differences. Using the various types of training data, a determination can be made as to the appropriate weighting for each feature of text being analyzed, in order to provide a more accurate final score or probability of a string being truncated at an edge of an image or screen. Different heuristics might be used with different data sets for various purposes, such as international languages that might run from right to left or up to down, etc. Some overrides might also be used, such as where text is returned without filtering if that text covers at least eighty percent of the screen, for example, as it is highly likely that the user is interested in this particular text, and if the recognized text is not correct the user will be able to tell that the device needs to be moved to properly recognize the text.

Figure 6:
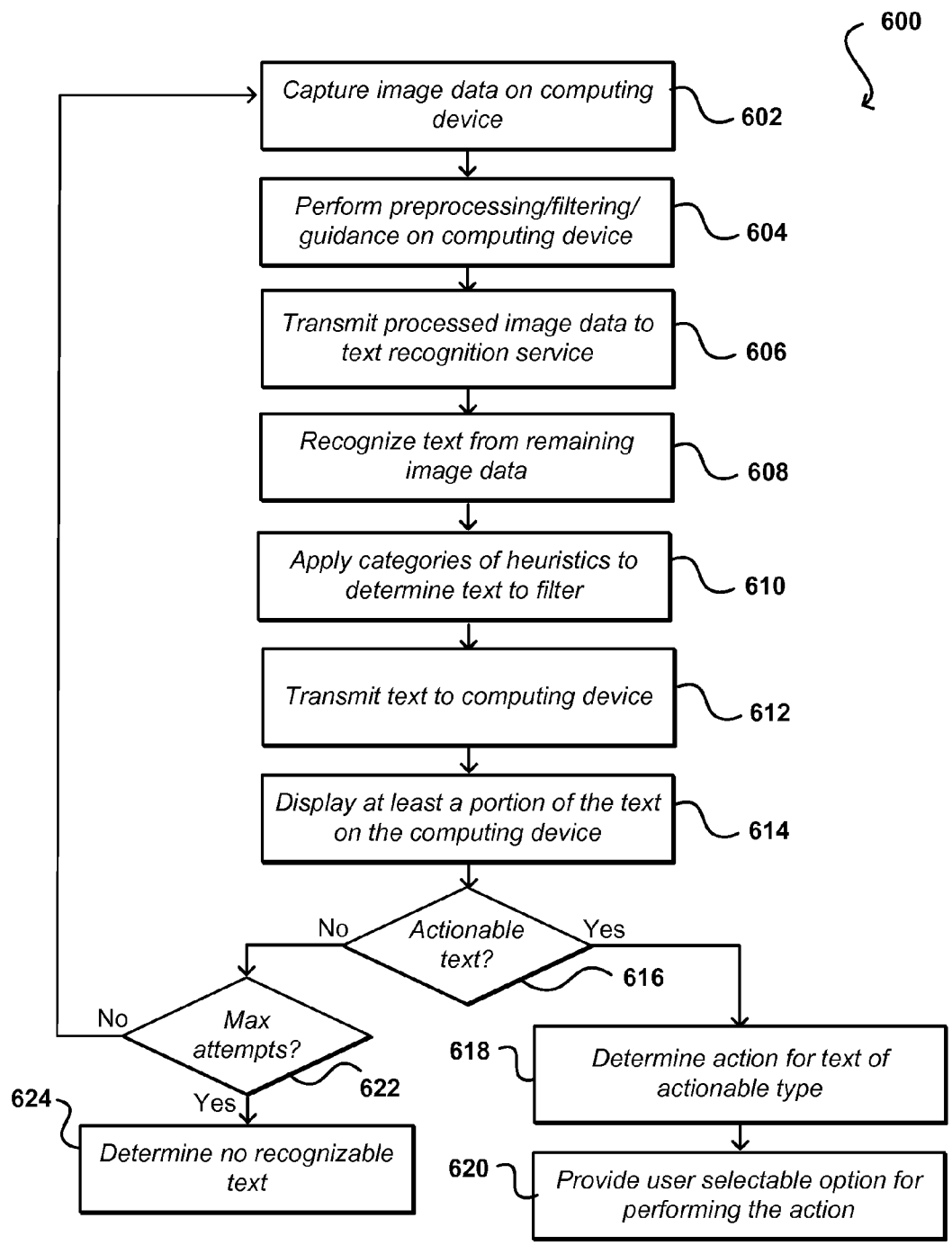
FIG. 6 illustrates an example of a process for recognizing text in an image that can be utilized in accordance with various embodiments.

FIG. 6 illustrates an example process 600 for recognizing text in an image that can be utilized in accordance with various embodiments. It should be understood that, for this and other processes discussed herein, there can be additional, fewer, or alternative steps performed in similar or alternative orders, or in parallel, within the scope of the various embodiments unless otherwise stated. In this example process, image data is captured 602 using at least one camera of a computing device. As discussed, this can include a frame of video data, a still image, stereoscopic image data, or a burst of images, among other such options. The computing device can perform at least some preprocessing 604, such by reducing noise and removing texture, filtering text near an edge of the image, determining regions that potentially contain one or more glyphs, and the like. In at least some embodiments, the device can also attempt to provide guidance to a use, as discussed herein, if it is determined that at least some text is likely truncated, in order to cause the user to bring the entire text string within the field of view of the appropriate camera. The image data, along with any other relevant data from the preprocessing, can be transmitted 606 to a text recognition service, or other system or service, for processing. In some embodiments, the filtering performed on the device will cause the filtered portions of the image to not be sent to the server for processing.

Once received by the text recognition service, for example, the transmitted image data can be analyzed 608 to recognize the text with at least a minimum level of confidence. The recognition can be performed using any appropriate process or module, such as an optical character recognition (OCR) engine. During and/or after the recognition, at least two categories of heuristics can be applied 610 to attempt to determine whether the text is likely truncated and thus should be tagged to be filtered from the results. In at least some embodiments a text string must be determined to not be truncated with at least a minimum level of confidence to avoid being tagged as filtered. The heuristic categories can include, for example, general text and type-specific text heuristics, among others. The heuristics can return confidence values, and the results from various heuristics can be combined to improve the confidence values for various recognized text strings and text objects. By providing all the text with any filtering tags to the client device, the client can determine which text to filter, and can also retain at least some of the text for aggregation or other purposes as discussed elsewhere herein.

The text from the data, along with any truncation or other tags, can then be transmitted 612 back to the computing device. At least a portion of the text (such as the text not tagged to be filtered) can be displayed 614 on a display of the computing device, or otherwise presented. A determination can be made 616 as to whether any of the recognized text corresponds to actionable text. If at least one text string or text object corresponds to actionable text, at least one action can be determined 618 that corresponds to a respective instance of actionable text. This can include, for example, dialing a phone number or sending a message to an email address. A user-selectable option then can be provided 620 for at least one instance of the actionable text in order to enable the user to trigger a performing of the action. If no actionable text is located, and potentially no text is located in the image, a determination 622 can be made as to whether a maximum number of attempts have been made to locate text. For example, for a given scene of data a maximum number of attempts might be made, or attempts made over a maximum period of time, to locate text in captured image data, after which it may be determined 624 that there is not actionable text and the process can stop, or pause, until a new scene is detected, manual input is provided, the device moves or changes orientation by a minimum amount, etc. If the maximum number of attempts has not yet been reached, additional image data can be captured and analyzed as discussed above.

Figure 7:
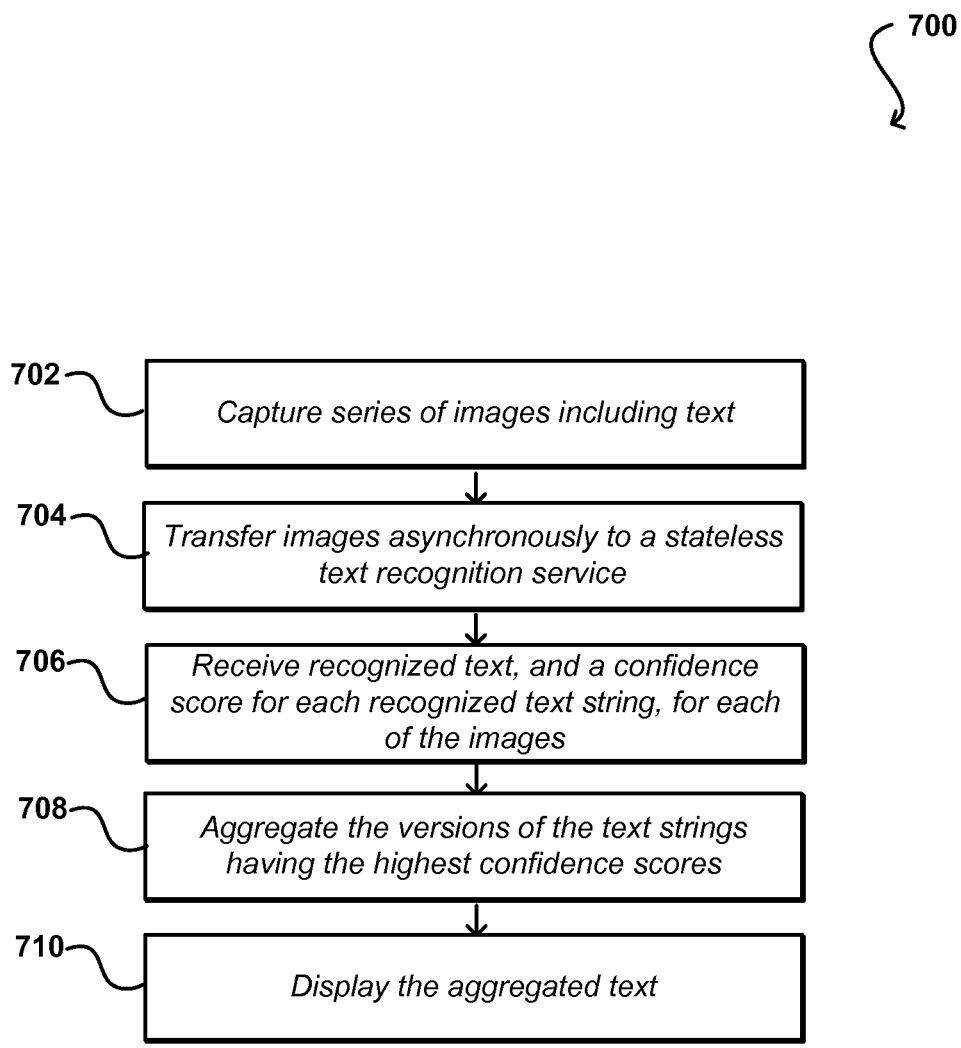
FIG. 7 illustrates an example of a process for improving text recognition accuracy using a series of images that can be utilized in accordance with various embodiments.

FIG. 7 illustrates another example process 700 wherein the results can be further improved by utilizing a series of images of video frames in accordance with various embodiments. A series of images can be captured 702 using at least one camera of the device. Based upon factors such as motion and lighting variations, for example, there might be at least somewhat slightly different information in each image, particularly near the edges of the images. Image data for each of the images, or at least a subset of the images, can be transmitted 704 asynchronously to a stateless text recognition service, or other such system or service, which can recognize text using a process for each image such as is described with respect to FIG. 7. In response, the computing device can receive 706 back recognized text, along with a corresponding confidence score in the recognition for each recognized text string or text object. There thus can be a version of each text string for each image, and the versions with the highest confidence scores can be aggregated 708 into a resulting group of text. In some embodiments, information such as the motion of the computing device during image capture (e.g., image homography) can be used to attempt to correlate text for the aggregation. The motion data can help correlation portions of the various images to assist with locating versions of text strings that are not truncated, or at least have a higher confidence of not being truncated. This aggregated text then can be displayed 710 to the user, along with user-selectable elements or other such objects as discussed and suggested elsewhere herein.

Figure 8:
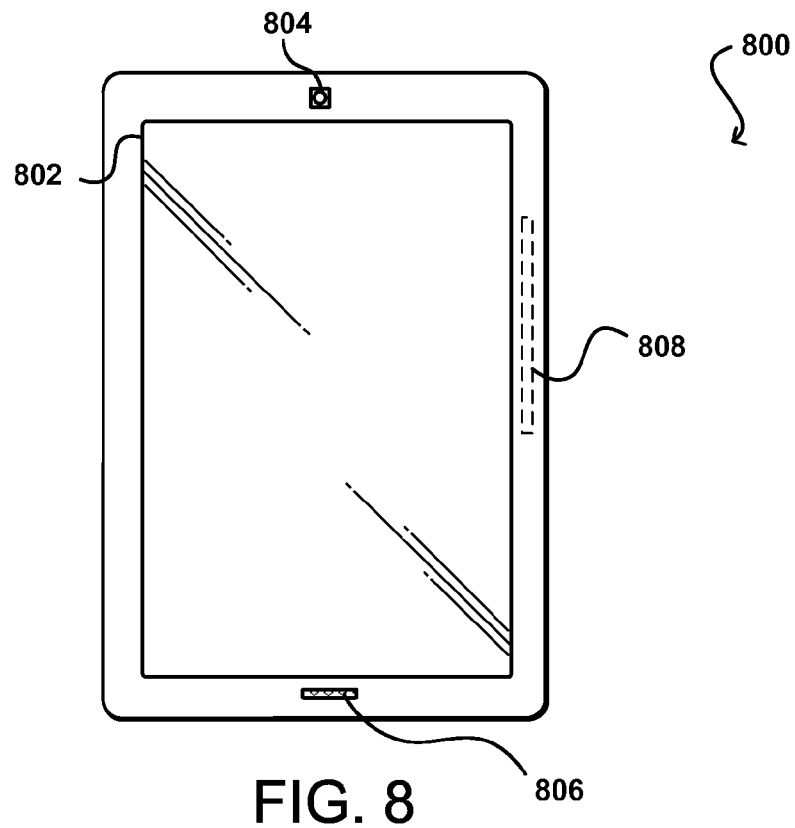
FIG. 8 illustrates an example computing device that can be utilized in accordance with various embodiments.

FIG. 8 illustrates an example client computing device 800 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others. The client device may have an associated browser width, browser height, as well as various other client-side information associated therewith.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The example computing device can include one or more image capture elements 804 for purposes such as conventional image and/or video capture. As discussed elsewhere herein, the image capture elements can also be used for purposes such as to determine motion and receive gesture input. While the portable computing device in this example includes an image capture element on the "front" of the device, it should be understood that image capture elements could also, or alternatively, be placed on the sides, back, or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 808, such as may include at least one wired or wireless component operable to communicate with one or more portable computing devices. The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
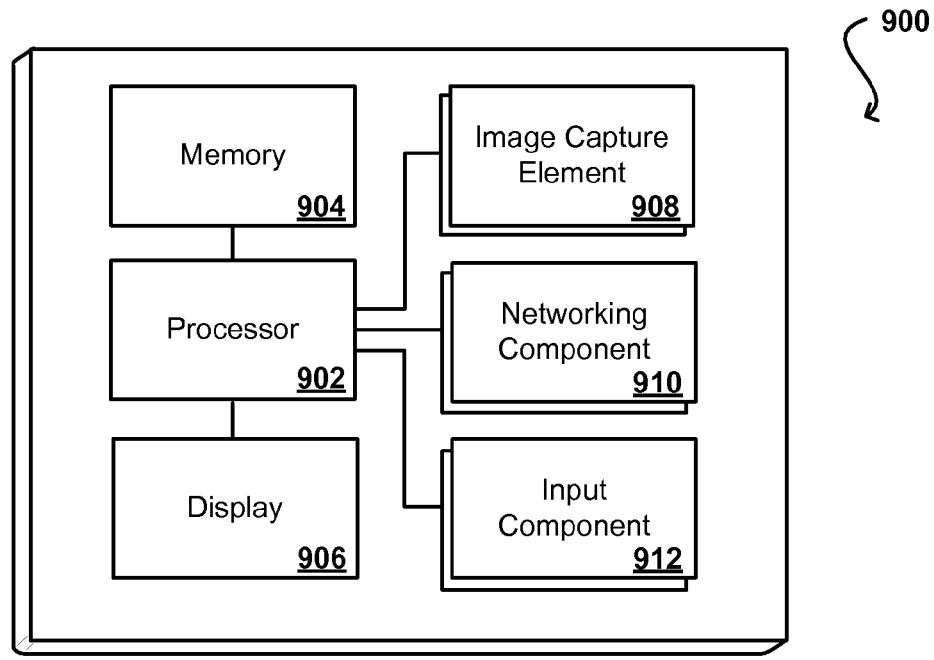
FIG. 9 illustrates an example set of basic components of a portable computing device, such as the device described with respect to FIG. 8.

In order to provide functionality such as that described with respect to FIG. 8, FIG. 9 illustrates an example set of basic components of a portable computing device 900, such as the device 800 described with respect to FIG. 8. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. The device can also include at least one network communication component 910, as may enable wired or wireless communication over at least one network, such as the Internet or a cellular network, among others. The networking component can provide a wireless channel, which can include any appropriate channel used to enable devices to communicate wirelessly, such as Bluetooth, cellular, or Wi-Fi channels. It should be understood that the device can have one or more conventional wired communications connections as known in the art. The example device includes various power components known in the art for providing power to a portable computing device, which can include capacitive charging elements for use with a power pad or similar device as discussed elsewhere herein. The example device also can include at least one touch and/or pressure sensitive element 818, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

The device, in many embodiments, will include at least one audio element, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element that provides information such as a position, direction, motion, or orientation of the device. This positioning element can include, for example, accelerometers, inertial sensors, electronic gyroscopes, electronic compasses, and GPS elements.

The device can include at least one additional input device 912 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
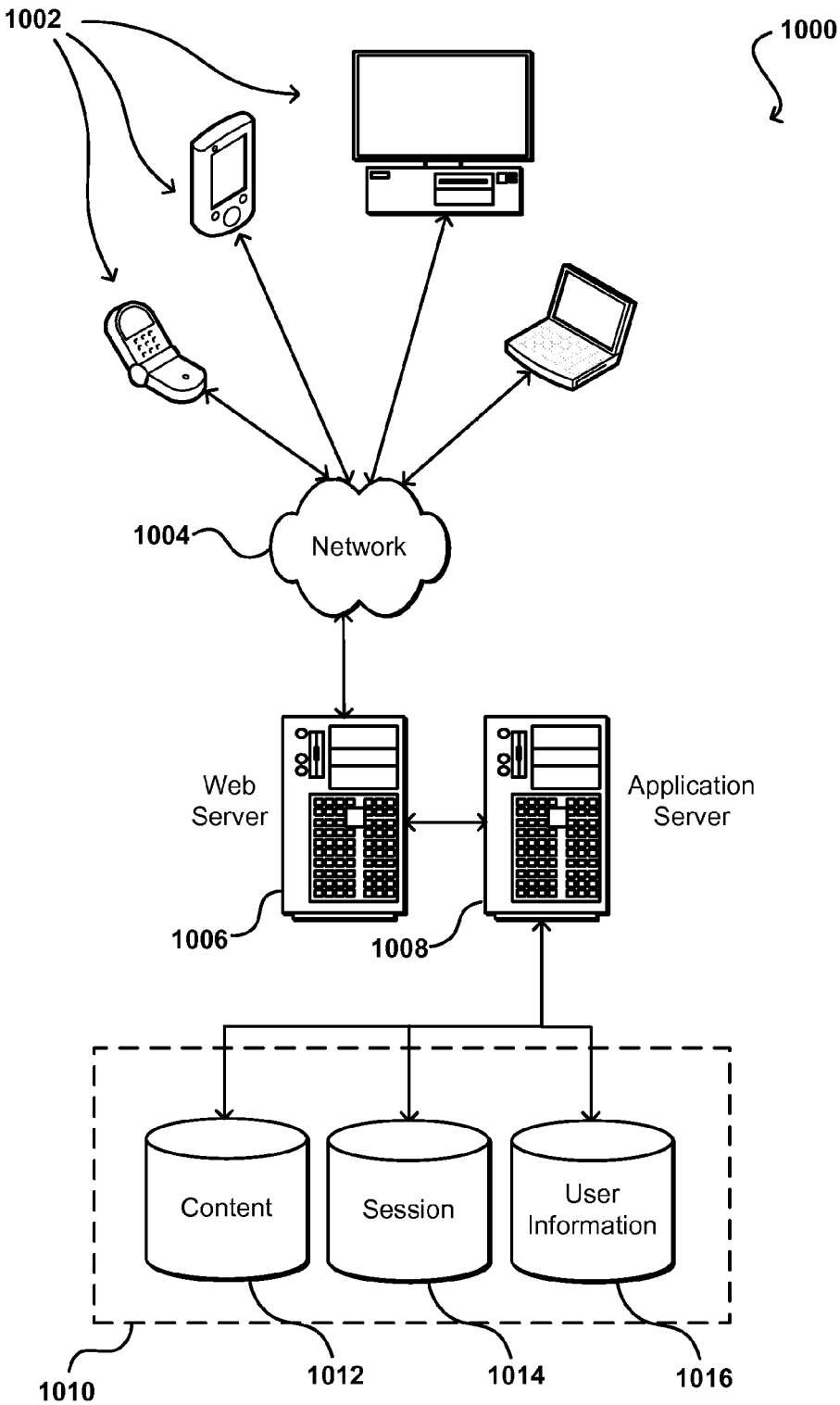
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solidstate storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
a client device configured to acquire image data using a camera, the image data including a representation of text contained within a field of view of the camera, and transmit the image data to a text recognition service; and
a text recognition service configured to analyze the image data using at least two categories of heuristics to attempt to identify text that is truncated at an edge of the image data, the at least two categories of heuristics including at least a general text heuristic and a type-specific heuristic, the text recognition system further configured to transmit the recognized text to the client device, the recognized text including a plurality of text objects each having a respective truncation confidence score as determined by the text recognition service,
wherein the client device is further configured to prevent one or more text objects from the recognized text from being displayed on the client device where the respective truncation confidence scores for the one or more text objects are less than a minimum truncation confidence score.

2. The system of claim 1, wherein the client device is further configured to:
perform a preprocessing of the image data before transmitting the image data to the text recognition system, the preprocessing including at least one of performing binarization, locating one or more text regions, performing text extraction, removing texture from the image data, reducing an amount of noise in the image data, determining regions indicative of glyphs in the image data, or determining text potentially truncated based at least in part upon proximity to an edge location in the image data.

3. The system of claim 1, wherein the client device is further configured to:
display one or more graphical elements on a display of the client device to prompt a user to move the computing device to cause the at least one text object of the one or more text objects to be completely within the field of view of the camera.

4. The system of claim 1, wherein the client device is further configured to:
receive, from the text recognition service, additional recognized text determined using additional image data including an additional representation of the text;
compare the respective truncation confidence scores from the one or more text objects against respective truncation scores for corresponding text objects in the additional recognized text;
select a version of each of the one or more text objects and corresponding text objects having the highest respective truncation score; and
cause any of the one or more text objects or corresponding text objects to be displayed on the client device when the highest respective truncation score at least meets the minimum respective truncation confidence score.

5. A computer-implemented method, comprising:
receiving, from a computing device, image data acquired using a camera of a computing device;
recognizing text for a text object identified in the image data;
processing, using at least one processor, the recognized text using a general text heuristic, the general text heuristic configured to determine a first truncation confidence score for the text object, the first truncation confidence score indicating a likelihood that the text object is truncated in the image data;
processing, using at least one processor, the recognized text using at least one type-specific heuristic, the at least one type-specific heuristic configured to identify a type of the text object based at least in part upon the text object matching a pattern of text for the type, the at least one type-specific heuristic further configured to determine a second truncation confidence score for the text object, the second truncation confidence score indicating a likelihood that the text object is truncated in the image data; and
transmitting, to the computing device, the recognized text and at least one truncation confidence score for the text object in the recognized text, the at least one confidence score for the text object determined using the first truncation confidence score and the second truncation confidence score for the text object.

6. The computer-implemented method of claim 5, wherein the general text heuristic is configured to identify an incomplete text object based at least in part upon at least one of optical character recognition (OCR) confidence score, proximity to actionable text, proximity to incomplete text, proximity to an edge of the image data, or presence of punctuation at an end of the text object.

7. The computer-implemented method of claim 5, wherein the at least one type-specific heuristic is configured to identify an incomplete text object upon the incomplete text object matching a pattern for a specific type of text object, the specific type of text object including at least one of a physical address, an email address, a Web address, a local phone number, an international phone number, contact information, a zip code, a bar code, a QR code, or a license number.

8. The computer-implemented method of claim 5, wherein the image data includes data for each of a set of images, the set of images being asynchronously received from the computing device, and further comprising:
   transmitting, to the computing device, the recognized text and the at least one truncation confidence score for each image of the set of images, wherein the computing device is capable of displaying a respective version of the recognized text object that has a highest respective truncation confidence score.

9. The computer-implemented method of claim 5, further comprising:
   performing semantic boosting on the recognized text, the semantic boosting performed by comparing the recognized text to a specified data set.

10. The computer-implemented method of claim 5, further comprising:
    generating at least one of the general text heuristic or the at least one type-specific heuristic by training a machine learning model using a plurality of different types of text objects.

11. The computer-implemented method of claim 5, wherein the image data has undergone preprocessing before being received, the preprocessing including at least one of performing binarization, locating one or more text regions, performing text extraction, removing texture from the image data, reducing an amount of noise in the image data, determining regions indicative of glyphs in the image data, and determining text likely truncated based at least in part upon proximity to an edge location in the image data.

12. The computer-implemented method of claim 5, wherein the text object is capable of being truncated at a top, bottom, right, or left edge position in the image data.

13. The computer-implemented method of claim 5, further comprising:
    aligning one or more text strings represented in at least two frames of the image data captured by the camera in order to identify corresponding text strings in the at least two frames.

14. A non-transitory computer-readable storage medium storing instructions that, when executed by at least one processor of a computing system, cause the computing system to:
   receive image data acquired using a camera of a computing device;
   recognize text for a text object identified in the image data;
   process the recognized text using a general text heuristic, the general text heuristic configured to determine a first confidence level for the text object, the first confidence level indicating a likelihood that the text object is truncated in the image data;
   process the recognized text using at least one type-specific heuristic, the at least one type-specific heuristic configured to identify a type of the text object based at least in part upon the identified text object matching a respective pattern of text for the type, the at least one type-specific heuristic further configured to determine a second confidence level of the identified text object, the second confidence level indicating a likelihood that the text object is truncated in the image data;
   transmit the recognized text to the computing device.

15. The non-transitory computer-readable storage medium of claim 14, wherein the image data includes data for each of a set of images, the set of images being asynchronously received from the computing device, and wherein the instructions when executed further cause the computing system to:
   transmit, to the computing device, the recognized text and the at least one truncation confidence score for each image of the set of images, wherein the computing device is capable of displaying a respective version of the recognized text objects that has a highest respective truncation confidence score.

16. The non-transitory computer-readable storage medium of claim 14, wherein the instructions when executed further cause the computing system to:
   determine that the identified text object corresponds to actionable text; and
   transmit, with the recognized text, information identifying the actionable text.

17. The non-transitory computer-readable storage medium of claim 14, wherein the instructions when executed further cause the computing system to:
   perform semantic boosting on the recognized text, the semantic boosting performed by comparing the recognized text to a specified data set.

18. The non-transitory computer-readable storage medium of claim 14, wherein the instructions when executed further cause the computing system to:
   generate at least one of the general text heuristic or the at least one type-specific heuristic by training a machine learning model using a plurality of different types of text objects.

19. The non-transitory computer-readable storage medium of claim 14, wherein the general text heuristic is configured to identify an incomplete text object based at least in part upon at least one of optical character recognition (OCR) confidence score, proximity to actionable text, proximity to incomplete text, proximity to an edge of the image data, or presence of punctuation at an end of the text object.

20. The non-transitory computer-readable storage medium of claim 14, wherein the at least one type-specific heuristic is configured to identify an incomplete text object upon the incomplete text object matching a pattern for a specific type of text object, the specific type of text object including at least one of a physical address, an email address, a Web address, a local phone number, an international phone number, contact information, a zip code, a bar code, a QR code, or a license number.

* * * * *